United States Patent [19]

Meynckens et al.

[11] Patent Number: 5,853,654
[45] Date of Patent: Dec. 29, 1998

[54] PROCESS AND APPARATUS FOR MAKING CERAMIC ARTICLES

[75] Inventors: Jean-Pierre Meynckens; Jean-Pierre Robert, both of Villers-Perwin, Belgium

[73] Assignee: Glaverbel, Brussels, Belgium

[21] Appl. No.: 849,168

[22] PCT Filed: Nov. 24, 1995

[86] PCT No.: PCT/BE95/00109

§ 371 Date: May 27, 1997

§ 102(e) Date: May 27, 1997

[87] PCT Pub. No.: WO96/16918

PCT Pub. Date: Jun. 6, 1996

[30] Foreign Application Priority Data

Nov. 28, 1994 [GB] United Kingdom ................ 94 23 985

[51] Int. Cl.⁶ .............................. B05D 1/08; C04B 35/65
[52] U.S. Cl. ........................... 264/635; 264/649; 264/81; 264/309; 425/449; 425/470; 425/DIG. 815
[58] Field of Search .................................... 264/635, 648, 264/309, 81; 425/449, 470, DIG. 815

[56] References Cited

U.S. PATENT DOCUMENTS

| 2,990,601 | 7/1961 | Wagner | 264/309 |
| 5,013,499 | 5/1991 | Willard . | |
| 5,061,527 | 10/1991 | Watanabe et al. . | |

FOREIGN PATENT DOCUMENTS

| 3218987 | 9/1991 | Japan . |
| 847449 | 9/1960 | United Kingdom . |
| 1097331 | 1/1968 | United Kingdom . |
| 1138284 | 12/1968 | United Kingdom . |
| 1168259 | 10/1969 | United Kingdom . |
| 1330894 | 9/1973 | United Kingdom . |
| 1517081 | 7/1978 | United Kingdom . |
| 2067459 | 7/1981 | United Kingdom . |
| 2103959 | 3/1983 | United Kingdom . |
| 2144055 | 2/1985 | United Kingdom . |
| 2154228 | 9/1985 | United Kingdom . |
| 90/03848 | 4/1990 | WIPO . |

*Primary Examiner*—James Derrington
*Attorney, Agent, or Firm*—Venable

[57] ABSTRACT

A process and apparatus for making a ceramic article, especially pipes and tubes of ceramic material such as silicon carbide, in which the article is formed by projecting a ceramic powder mixture comprising refractory particles and combustible particles against a smooth-surface metal former which is heated to a temperature of at least 850° C. where in the presence of an oxygen-rich gas the combustible particles react exothermically to produce from the refractory particles and the reaction product of the combustible particles a coherent refractory article in the shape of the former.

19 Claims, No Drawings

PROCESS AND APPARATUS FOR MAKING CERAMIC ARTICLES

BACKGROUND OF THE INVENTION

1. Field of the Invention

The present invention relates to the formation of ceramic articles and to the apparatus used for the said formation. It is particularly, but not exclusively, concerned with the formation of pipes and tubes of ceramic material.

2. Description of the Related Art

Ceramic pipes and tubes have traditionally been formed from clay moulded into the desired "green" shape and then baked in an oven. These are still widely used but are not of high quality in regard to mechanical strength and ability to withstand high temperatures such that a high proportion of breakages are incurred. For ceramic pipes and tubes capable of withstanding more demanding duties, especially for such heavy duty ceramics as silicon carbide, the manufacturing methods have however become increasingly more complex. Japanese published patent specification JP-A-03-218987 describes the manufacture of a composite silicon carbide-metal pipe for such duties as combustion pipes of gas turbine engines. This manufacture first forms a layer of a uniform mixture of silicon carbide powder and carbon powder on the inner surface of a metal pipe. Excess silicon is then added and a mixed powder layer of aluminium and $Fe_3O_4$ is laminated to the first layer to form a tubular article. The tubular article is is then subjected to very fast rotation such that a thermit reaction occurs and creating sintered silicon carbide in the first layer.

The present invention has as its object the preparation of high quality ceramic articles such as pipes and tubes while avoiding such complex procedures.

Specifically the present invention has arisen from investigations into how to apply to the manufacture of ceramic articles a technique similar to the ceramic welding process.

In "ceramic welding" a mixture of solid refractory particles and solid combustible fuel particles of a metal or semi-metal such as aluminium and silicon is projected against a target surface where the combustible particles react in an highly exothermic manner with oxygen gas to produce with the refractory particles a coherent refractory mass together with the oxide(s) produced by the reaction.

There have been many patents on ceramic welding, starting with GB patent 1,330,894 (Glaverbel). While it is known to employ ceramic welding processes to form a refractory article, for example, a block having a particular shape for use in constructing or repairing an industrial furnace, it has historically mainly been used in the in-situ repair of furnace refractories, for example the refractories used in the walls of glassmaking furnaces or coke ovens. The ceramic welding mixture is projected to the required point of repair where it produces a coherent refractory mass adhering to the furnace wall.

The refractory materials used in furnaces include such oxide materials as alumina, silica and zirconia. Refractories having a base of silicon carbide are used in certain metallurgical plant, in particular in ferrous blast furnaces or in zinc distillation columns. The combustible particles and refractory particles used in the repair mixture are usually chosen so that the coherent refractory mass is of a similar chemical composition to the furnace refractory.

SUMMARY OF THE INVENTION

According to the present invention there is provided a process for making a ceramic article from a powder mixture comprising refractory particles and combustible particles, in which the combustible particles are reacted exothermically in the presence of an oxygen-rich gas to produce the article from the refractory particles and the reaction product of the combustible particles, characterised in that the powder mixture is projected against a metal former, which is heated to a temperature of at least 850° C., to produce a coherent refractory article in the shape of the former and the former is then separated from the article.

Apparatus for forming a refractory mass comprising spraying means for spraying particles of oxidizable material and refractory material together with oxygen are known, e.g. apparatus according to WO,A,90 03848 (Willmet, Inc.). The present invention further provides apparatus for making a ceramic article comprising projection means for a powder mixture comprising refractory particles and combustible particles, supply means for an oxygen-rich gas characterised in that it comprises a metal former made of a material which is resistant to high temperature and to chemical attack, against which the projected particles can be reacted with the oxygen-rich gas to produce from the refractory particles and the reaction product of the combustible particles a coherent refractory article in the shape of the former, wherein the surface of the metal former is free from any indentations or projections which would tend to assist a bond being created between the weld material and the metal.

DESCRIPTION OF THE PREFERRED EMBODIMENTS

The invention is well suited to production of all types of ceramic article, for example flat plates, curved plates, corrugated plates, dishes and open conduits. It is however particularly well suited to the production of hollow articles such as pipes, tubes, tubular connectors and junction pieces.

The articles produced according to the invention have high levels of refractory properties and good mechanical strength, thus permitting their use in heavy duty applications of ceramic materials. They are especially well suited for use in high efficiency heat exchangers, in corrosion-resistant immersion heaters, gas nozzles and metal ducts for example steel ladle nozzles. The need for corrosion resistance is particularly marked in use with molten metals such as zinc and aluminium.

The invention has the further advantage of permitting the production of components from high grade refractory material. The presence of low melting point phases is avoided, giving an advantage over classical techniques using slip casting, firing or calcining.

The invention represents a simplified alternative to the usual methods of making ceramic articles of large dimensions or of complex shape. Moreover their production is fast and reliable, and because they are fabricated solely from the chosen starting material there is considerable flexibility in choice of end-product properties by appropriate choice of starting materials.

Preferred examples of the refractory particles include silicon carbide, alumina, zirconia and alumino-zirconia. Silicon carbide is especially desirable as a constituent of articles required to have good resistance to high temperatures.

The combustible particles are preferably selected from silicon and aluminium or mixtures thereof.

The refractory particles preferably have a maximum dimension of 2 mm. This helps in ensuring a minimum loss of refractory by rebound from the target surface. The combustible particles preferably have an average particle diameter not greater than 50 μm. [The term "average particle diameter" as employed herein denotes a dimension such that 50% by weight of the particles have a smaller dimension than this average.]

Heating of the former to a temperature of at least 850° C. ensures the ignition of the combustible particles. Following ignition the combustible particles burn with considerable release of heat. The former may be preheated to a temperature of at least 850° C., thereby ensuring the ignition of the combustible particles as they reach the former. The projection can alternatively be directed at a former which is at a lower temperature than 850° C., for example at ambient temperature, and then to raise the temperature of the former to initiate the reaction.

The powder mixture is preferably projected from a single lance, although a multiple lance configuration can be employed if desired.

Conveniently the carrier gas for the powder is the oxygen-rich gas used for the combustion. In general it is preferred to use commercial grade pure oxygen since this assists in achieving a high reaction temperature.

In general the powder is progressively applied to the former, staring at one point and working across the whole surface of the metal former. The application pattern can be applied manually but conveniently the lance and former are so mounted relative to each other that a pre-set and repeatable mechanical movement of the lance and metal former relative to each other is achieved.

The metal former should be made of a material which is resistant to high temperature and to chemical attack. Stainless steel is generally preferred. The shape of the metal former is determined by the required shape of the article. Thus another advantage of the invention is that with an appropriate choice of shape of the metal former it can be used to produce articles of a complex configuration, for example heat-resistant T-piece and L-piece components used in exhaust manifolds. The surface of the former to receive the the weld material is smooth and free from any indentations or projections so as to resist any tendency for a bond being created between the weld material and the metal.

Because the surface of the coherent ceramic material produced on the former precisely matches the surface shape of the metal former, thus allowing for production of hollow articles with very precise and repeatable internal dimensions.

The apparatus comprises means to move the former relative to the projection lance. This can be achieved by simply moving the projection means but it may be convenient for the former itself to be movable.

For pipe and tube making the metal former should be in the shape of an elongated cylinder. By rotating the cylinder about its axis the ceramic deposit can be applied from a single lance at a single point. For pipes and tubes of length no greater than that of the cylinder the lance can be moved parallel to the axis of the cylinder so as to cover the whole surface of the cylinder with a ceramic coating.

A particular advantage of the process of the invention is that it can be employed to produce tubular articles with dimensions not limited by the size of the former. This can be achieved by removing the tubular article from the cylinder as it is being formed: as the first annular band of the tubular article solidifies it can be gripped by a handling tool and moved away from the cylinder in an axial direction while formation of the next annular band of the article is in progress. In such an arrangement the total possible length of tubing is not limited at all by the forming process and depends on the adjacent handling space and equipment.

For many applications the separation of the article from the former can be most easily achieved by simply withdrawing the former. Removal of the formed article from the former can be facilitated if required by pre-coating the former with a refractory cement which becomes brittle as a result of the heat applied to it during the forming procedure and then easily breaks away from the surface of the former or the article. Alternatively the former can be cooled, for example to ambient temperature, so that it shrinks relative to the formed article and can thereby be more readily removed.

The invention is further illustrated below with reference to the following examples. It is however stressed that the invention is not limited to the specific quantities and procedures described in these examples.

EXAMPLE 1

A cylindrical tube made of INOX stainless steel and rotatable about its axis was placed in an oven at 1000° C. for preheating. The cylinder had an external diameter of 40 mm and a length of 150 mm and its external surface was smooth, having no significant indentations or projections. By means of a lance there was projected onto the pre-heated cylinder while it was rotated a powder mixture of the following composition (by weight):

| | |
|---|---|
| Silicon carbide | 79% |
| Silicon | 8% |
| Aluminium | 5% |
| Magnesia | 8% |

The silicon particles had a dimension below 45 μm and a specific surface area between 2,500 and 8,000 cm$^2$/g. The aluminium particles had a dimension below 45 mm and a specific surface area between 3,500 and 6,000 cm$^2$/g. The dimension of the silicon carbide particles was less than 1.47 mm, with 60% by weight from 1 to 1.47 mm, 20% from 0.5 to 1 mm, and 20% below 0.125 mm. The magnesia particles had an average dimension of approximately 300 μm.

The powder mixture was conveyed in a stream of commercially pure oxygen. After a few minutes a refractory layer about 10 mm thick had been applied to the cylinder surface. The cylinder was then cooled to ambient temperature and was easily withdrawn to leave a formed tube of the refractory with an internal diameter of 40 mm and length of 150 mm. The inner surface of the formed tube was completely smooth.

EXAMPLE 2

A cylindrical tube of the type described in Example 1 but of larger dimensions and with an integral heating means was coated with a layer of refractory cement and then heated to 1100° C. A powder mixture of the composition defined in Example 1 was projected in a stream of commercially pure oxygen from a lance onto the coated surface while the cylinder was rotated. Projection was continued for several minutes to form a refractory layer on the cement. After formation of the refractory layer the cylinder was heating was stopped, the cylinder was allowed to cool to ambient temperature and again was easily withdrawn. In this case the formed tube of the refractory had an internal diameter of 200 mm and a length of 1 meter.

What is claimed is:

1. A process for making a ceramic article, comprising:

a. providing a powder mixture comprised of refractory particles and combustible particles which react exothermically;

b. heating a metal former to a temperature of at least 850° C.;

c. projecting the powder mixture against the metal former, either before or after heating the metal former to a temperature of at least 850° C., in the presence of an oxygen-rich gas so that the combustible particles react exothermically and produce a ceramic article on the metal former from the refractory particles and the reaction product of the combustible particles, which ceramic article is comprised of a coherent refractory material and has a shape which conforms to that of the metal former; and d. separating the metal former from the ceramic article.

2. The process as claimed in claim 1, wherein the ceramic article is a hollow article.

3. The process as claimed in claim 1, wherein the refractory particles comprise particles of at least one of silicon carbide, alumina, zirconia and alumino-zirconia.

4. The process as claimed in claim 1, wherein the combustible particles are selected from the group consisting of silicon, aluminum, and mixtures thereof.

5. The process as claimed in claim 1, wherein the refractory particles have a maximum dimension of 2 mm.

6. The process as claimed in claim 1, wherein the combustible particles have an average particle diameter not greater than 50 $\mu$m.

7. The process as claimed in claim 1, wherein the metal former is preheated to a temperature of at least 850° C.

8. The process as claimed in claim 1, wherein the powder mixture is projected from a single lance.

9. The process as claimed in claim 1, wherein the powder mixture is projected from multiple lances.

10. The process as claimed in claim 1, wherein the powder mixture is carried by a carrier gas which is the oxygen-rich gas used for combustion.

11. A process for making a ceramic article, comprising:

a. providing a metal former and pre-coating the metal former with a refractory cement;

b. heating the metal former to a temperature of at least 850° C.;

c. providing a powder mixture comprised of refractory particles and combustible particles which react exothermically;

d. projecting the powder mixture against the metal former, either before or after heating the metal former to a temperature of at least 850° C., in the presence of an oxygen-rich gas so that the combustible particles react exothermically and produce a ceramic article on the metal former from the refractory particles and the reaction product of the combustible particles, which ceramic article is comprised of a coherent refractory material and has a shape which conforms to that of the of the metal former; and e. separating the metal former from the ceramic article, which separation is facilitated by the pre-coating of the metal former with the refractory cement which becomes brittle as a result of the heat applied to it during projection so as to facilitate the removal of the ceramic article from the metal former.

12. The process as claimed in claim 11, further comprising cooling the metal former prior to separation of the ceramic article from the metal former so as to facilitate the removal of the ceramic article from the metal former.

13. The process as claimed in claim 1, wherein the projected powder mixture is progressively applied to the metal former, starting at one point and working across the whole surface of the metal former.

14. A process for making a ceramic article, comprising:

a. providing a powder mixture comprised of refractory particles and combustible particles which react exothermically;

b. heating a metal former to a temperature of at least 850° C.;

c. projecting the powder mixture against the metal former in the presence of an oxygen-rich gas so that the combustible particles react exothermically and produce a ceramic article on the metal former from the refractory particles and the reaction product of the combustible particles, which ceramic article is comprised of a coherent refractory material and has a shape which conforms to that of the metal former; and d. separating the metal former from the ceramic article, wherein the ceramic article is a tubular article which is removed from the metal former as it is being formed.

15. The process as claimed in claim 1, wherein the metal former has a surface which is free from any indentations or projections which would tend to assist formation of a bond between the coherent refractory material and the metal former.

16. An apparatus for making a ceramic article, comprising:

projection means for projecting a powder mixture comprised of refractory particles and combustible particles;

supply means for an oxygen-rich gas; and a metal former made of a material which is resistant to high temperature and to chemical attack, against which the projected powder mixture can react with the oxygen-rich gas in use to produce a ceramic article on the metal former from the refractory particles and the reaction product of the combustible particles, which ceramic article is comprised of a coherent refractory material and has a shape which conforms to that of the metal former from the refractory particles and the reaction product of the combustible particles, wherein the metal former has a surface which is free from any indentations or projections which would tend to assist formation of a bond between the coherent refractory material and the metal former.

17. The apparatus as claimed in claim 16, wherein the projection means comprises at least one lance, and wherein the powder mixture is projected through the at least one lance, and wherein the at least one lance and metal former are so mounted relative to each other that a pre-set and repeatable mechanical movement of the at least one lance and the metal former relative to each other is achievable.

18. The apparatus as claimed in claim 17, wherein the metal former has a shape of an elongated cylinder.

19. The apparatus as claimed in claim 18, wherein the elongated cylinder is rotatable about its axis.

* * * * *